United States Patent [19]

Kalfoglou

[11] 4,006,779
[45] Feb. 8, 1977

[54] LIGNOSULFONATES AS SACRIFICIAL AGENTS IN OIL RECOVERY PROCESSES

[75] Inventor: George Kalfoglou, Houston, Tex.

[73] Assignee: Texaco Inc., New York, N.Y.

[22] Filed: June 30, 1975

[21] Appl. No.: 591,574

[52] U.S. Cl. .................................. 166/275; 166/273
[51] Int. Cl.$^2$ .................. E21B 43/20; E21B 43/22
[58] Field of Search .................... 166/273, 274, 275

[56] References Cited

UNITED STATES PATENTS

| | | | |
|---|---|---|---|
| 3,384,171 | 5/1968 | Parker | 166/274 |
| 3,476,188 | 11/1969 | Harvey | 166/275 |
| 3,478,823 | 11/1969 | Murphy | 166/274 |
| 3,520,366 | 7/1970 | Jones | 166/274 |
| 3,532,166 | 10/1970 | Williams | 166/274 |
| 3,688,844 | 9/1972 | Roszelle | 166/273 |
| 3,700,031 | 10/1972 | Germer et al. | 166/274 |
| 3,844,350 | 10/1974 | Knight et al. | 166/273 |

Primary Examiner—Stephen J. Novosad
Assistant Examiner—George A. Suchfield
Attorney, Agent, or Firm—T. H. Whaley; C. G. Ries; Kenneth R. Priem

[57] ABSTRACT

A process for producing petroleum from subterranean formations is disclosed wherein production from the formation is obtained by driving a fluid from an injection well to a production well. The process involves injecting via the injection well into the formation an aqueous solution of lignosulfonate salt as a sacrificial agent to inhibit the deposition of surfactant contained in a micellar dispersion (microemulsion) on the reservoir matrix. Normally the process would be carried out by first injecting the lignosulfonates into the formation through the injection well and following them with a micellar dispersion which may contain lignosulfonates. The micellar dispersion would then be followed by a drive fluid such as water to push the dispersion to the production well.

9 Claims, No Drawings

LIGNOSULFONATES AS SACRIFICIAL AGENTS IN OIL RECOVERY PROCESSES

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65–90% or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the injection well. A major disadvantage to water flooding, however, is its relatively poor displacement efficiency largely due to the fact that water and oil are immiscible at reservoir conditions, and high interfacial tension exists between the flood water and the oil. For this reason, after a water flood, a large portion of the oil is still left unrecovered in the reservoir.

It has been recognized by those skilled in the art that a solution affecting a reduction in this interfacial tension between the water and oil would provide a much more efficient recovery mechanism. Therefore, the inclusion of a surface active agent or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,333,381. Other specialized surfactants, as will be discussed later, have been discovered to have special properties useful in water flooding operations such as a tolerance for high salinity and calcium and/or magnesium ion concentrations often found in reservoir waters.

The surfactant systems, however, have been found to be deficient for certain situations. Surfactant solutions are often not viscous enough to provide a proper mobility ratio and, therefore, tend to finger through the oil instead of driving it ahead of a relatively flat front. The emulsification of a hydrocarbon with a surfactant often provides a material with increased viscosity over an aqueous surfactant solution and prevents fingering. The emulsions are variously called micellar dispersions, microemulsions and dispersions.

However, field operations employing these emulsions have not always been entirely satisfactory due to the fact that the surfactant component is often adsorbed by the formation rock to a relatively high degree, resulting in a destabilization of the emulsion as it progresses through the reservoir.

SUMMARY OF THE INVENTION

The invention is a process of producing petroleum from subterranean formations having an injection well and a production well in communication therewith. The process comprises injecting into the formation via the injection well an aqueous solution of lignosulfonate salts and then injecting via the injection well into the formation a micellar dispersion of surfactant and hydrocarbon (which may or may not contain lignosulfonate salts). It is usual practice then to inject a fluid such as water to sweep the tapered micellar dispersion through the reservoir to the production well, thereby displacing oil from the subterranean formation to the surface of the earth. Alternatively, the lignosulfonate salts may be injected only in admixture with the micellar dispersion.

DESCRIPTION OF THE PREFERRED EMBODIMENTS

A sacrificial is injected by the process of this invention through an injection means comprising one or more injection wells into a subterranean, petroleum-containing formation to preferably occupy or cover all potential adsorption sites of the rock within the subterranean formation thereby reducing the extent of adsorption of the more expensive surfactant in the micellar dispersion injected therebehind. A sacrificial agent performs best when it exhibits high adsorption on active sites of rock surfaces, and thus diminishes surfactant adsorption. Chemical compounds of polyelectrolytic nature have the proper physico chemical and structural requirements to behave a successful sacrificial agents. The functional groups on the sacrificial agent molecules enhance adsorption either by hydrogen bonding or electrostatic attraction to active sites on the rock surfaces.

A satisfactory sacrificial material has at least three important characteristics. First, it must be less expensive than the surfactant on cost effectiveness basis since it is to be sacrificed or adsorbed by the formation, probably not to be recovered. Next, it must be adsorbed readily by the subterranean formation matrix. Preferably the sacrificial material should be adsorbed more readily than the surfactant(s) to be used in the process. This will enable the sacrificial agent to be used not only as a preflush but in admixture with the micellar dispersion. The third important characteristic of a sacrificial agent is that the presence of such adsorbed sacrificial material must retard or eliminate the subsequent adsorption of the surfactant on the adsorption site of the formation rock. By adsorption sites of the formation rock is meant those parts of the surfaces of the pores of the formation rock capable of adsorbing a chemical compound from a solution on contact.

The sacrificial material does not normally have any appreciable effect on the recovery efficiency of the chemical flooding operation. Additional oil is recovered only if the sacrificial material is followed by or is admixed with a micellar dispersion which will effectively increase the amount of oil displaced from the subterranean formation. The micellar dispersion should be injected after the sacrificial agent or in admixture with and ahead of the following flooding water thereby achieving the desired interfacial tension reduction between the injected fluid and the displaced fluid without loss of surfactant to the formation matrix. Various surfactants known in the art may be used in the micellar dispersion disclosed and claimed in the following U.S. patent applications are particularly useful since they have been found to be capable of performing in reservoirs having both high salinities and high hardness levels: Ser. Nos. 421,175; 421,296, and 421,181 all filed Dec. 3, 1973. Micellar dispersions are known in the art and are described in various patents. For example, U.S. Pat. No. 3,536,136 explains micellar dispersions and the disclosure is hereby incorporated by reference.

In a specific embodiment of this invention, a sacrificial material comprising lignosulfonate salts is injected via the suitable injection means, i.e. through one or more injection wells completed in the subterranean hydrocarbon formation, so that the sacrificial material enters the formation ahead of the micellar dispersion. The dispersion is then injected into the subterranean hydrocarbon-containing formation followed by a slug of polymer solution and the injection water to drive it to the production well. The sacrificial material adsorbs on and occupies the sites existing in the matrix of the formation thereby eliminating or substantially decreasing the tendency for the subsequently injected surfactant in the micellar dispersion to adsorb on the rock matrix.

In a broad embodiment of this invention, a sacrificial material is injected into a petroleum reservoir ahead of a micellar dispersion. In another embodiment the sacrificial agent is injected in admixture with the micellar dispersion into the petroleum formation. This micellar dispersion-sacrificial agent mixture may or may not be preceded by a slug of sacrificial material only.

In any of the embodiments and others which are obvious to those skilled in the art the micellar dispersion (whether it contains sacrificial agents or not) may be followed by a material to taper the viscosity before drive water is injected. This technique known well to those in the art, prevents the water from fingering into the more viscous micellar dispersion.

The sacrificial agents useful in the process of my invention are lignosulfonate salts. Lignosulfonates are anionic polyelectrolytes soluble in water and tolerate hard water (polyvalent ions, e.g. calcium and magnesium). They are also thermally stable in formations where the temperature is high. Lignosulfonates are macromolecules built up by complex condensation of phenyl propane units. The sulfonate groups are attached to the aliphatic side chain, mainly to alpha carbon. Lignosulfonates are water soluble with molecular weights ranging from several thousand to around 20,000. They are economically attractive since being by-products of the pulping industry, they are plentiful and cost less than either the surfactants or the polymers used in enhanced oil recovery methods. The polyelectrolyte lignosulfonates with strongly ionized sulfonate groups are negatively charged species and have a tendency to adsorb on solid surfaces thereby imparting a negative charge to them. The rock surfaces of a reservoir treated with lignosulfonates will be inert towards the anionic surfactants and the flood water and therefore loss of surfactants to the rock surfaces will be kept to a minimum. The same phenomenon will occur with the polymer thickened drive fluid.

Lignin is second only to cellulose as the principal constituent in wood. Generally, lignin is a complex phenolic polyether containing many different functional groups including carboxyls, carbonyls, and alcoholic and phenolic hydroxyls. Lignins and their derivatives are described in Kirth-Othmer Encyclopedia of Chemical Technology, Second Edition, Vol. 12, beginning at page 361. This publication describes two very broad classes of lignin derivatives: sulfite lignins and alkali lignins.

The difference in the lignins exists because of the method of extraction of lignin material from woody materials. Sulfonated alkali lignins are readily available commercially from various sources including but not limited to West Virginia Pulp and Paper Company under the tradename REAX 80's. Their general method of preparation is described in the Encyclopedia of Chemical Technology referred to above. Briefly, sulfonated alkali lignins are prepared by cooking woodchips with a 10% solution of a mixture of sodium hydroxide with about 20 mole percent of sodium sulfide. The lignin with wood is modified in a sodium compound often termed sodium lignate or alkali lignin which is very soluble in the strongly alkaline solution. These alkali lignins are removed from solution by lowering the pH which precipitates out the alkali lignins. These unsulfonated alkali lignins are sold under various tradenames including INDULIN. These alkali lignins are used to prepare the sulfonated derivatives. Methods of sulfonation are known by those skilled in the art. One typical method involves treating the alkali lignins with a solution of alkali sulfites at elevated temperature and pressure. The degree of sulfonation may be controlled to provide a variety of sulfonated alkali lignins.

The other main type of lignin derivatives are called sulfite lignins or sulfite lignosulfonates. Sulfite lignins are generally made by cooking woodchips under pressure in a solution of sulfurous acid and calcium, magnesium, sodium or ammonium bisulfite. This process converts insoluble lignins to soluble lignosulfonic acid. The lignosulfonic acids or calcium, magnesium, sodium or ammonium salts of the lignosulfonic acids are available under various tradenames including MARASPERSE, LIGNOSITE, ORZAN, TORANIL, and RAYFLO.

The broad term lignosulfonates used herein refers to both sulfonated alkali lignins and sulfite lignosulfonates (sulfite lignins). These are distinct types of compounds as explained above. Since the alkali lignins require sulfonation after extraction of the lignins from the woody products, it is proper to call them sulfonated alkali lignins. Likewise since sulfite lignins emerge from the extraction process already sulfonated, it is proper to refer to this class of materials as sulfite lignins or sulfite lignosulfonates.

Modified sulfonated alkali lignins and sulfite lignosulfonates, such as those with ring sulfomethylation and/or carboxylation are also useful as sacrificial agents.

Lignosulfonates having degrees of sulfonation from about 2.0 to saturation are acceptable in this invention. Cations which are acceptable include calcium, magnesium, sodium, potassium, ammonium and ferrochrome. The degree of sulfonation is the weight percentage of sulfonate ($SO_3^-$) compared to the total molecular weight.

The quantity of sacrificial lignosulfonate materials to be injected into the subterranean hydrocarbon formation may be any amount up to and including an amount sufficient to occupy substantially all of the active sites of the formation matrix. If less than the maximum amount is used, there will be a corresponding increase in the adsorption of surfactant from the micellar dispersion onto the formation matrix although the amount of increase will not be as great as in the case where the formation is completely free of sacrificial lignosulfonate salts. At a maximum, only the amount of sulfonate salts needed to completely occupy the active sites on the formation is needed. Although the only detriment resulting from using excess lignosulfonate salt would be an increase in the cost of operating the oil recovery program.

The amount of sacrificial lignosulfonate salts needed in the process of the invention depends on the particular formation, the area or pattern to be swept and other formation characteristics. Those skilled in the art can determine the exact quantity needed to afford the desired amount of protection.

of various lignosulfonates as sacrificial agents. The results are given below.

TABLE I

| Lignosulfonate | % Tertiary Oil Recovery |
|---|---|
| Sodium sulfonated alkali lignin (degree of sulfonation=13.5%) | 88.2 |
| Sodium sulfated alkali lignin (degree of sulfonation=17.5%) | 77.6 |
| Calcium lignosulfonate (degree of sulfonation=14.2% | 81.4 |
| Sodium lignosulfonate (degree of sulfonation=13.7%) 83.8 | |
| Sodium lignosulfonate (degree of sulfonation=16.8%) | 76.7 |
| None | 65.3 |

TABLE II

| DESCRIPTION OF CHEMICALS USEFUL AS SACRIFICIAL AGENTS | |
|---|---|
| Trade Name | Description |
| Sulframin 1240 | Sodium n-dodecyl benzene sulfonate |
| Sulfonated Surfonic N-40 | Sodium nonyl phenol polyoxyethylene (4 moles) sulfonate |
| Alipal CO-436 | Ammonium nonyl phenol polyoxyethylene (4 moles) sulfate |
| Kelzan MF | Polysaccharide |
| Sulfite lignosulfonates: | |
| Marasperse C-21 | Calcium and sodium lignosulfonate (degree of sulfonation = 14.2%) |
| Marasperse N-22 | Sodium lignosulfonate (degree of sulfonation = 13.7%) |
| Marasperse BS-22-3 | Sodium lignosulfonate (degree of sulfonation = 13.5%) |
| Marasperse BS-22-6 | Sodium lignosulfonate (degree of sulfonation = 17.7%) |
| Lignosite | Calcium lignosulfonate (degree of sulfonation = 13.5%) |
| Lignosite 854 | Sodium lignosulfonate (degree of sulfonation = 14.0%) |
| Lignosite 458 | Sodium Lignosulfonate (degree of sulfonation = 13.5%) |
| Carboxylated sulfite lignosulfonates: | |
| Marasperse 22s-z | Sodium lignsulfonate (degree of sulfonation = 15.3%) |
| Norlig 41s-2z | |

*Degree of sulfonation is taken from manufacturer's literature.

EXAMPLES

Crushed slaughter limestone cores are used in limestone pack to study the ability of lignosulfonates to improve the efficiency of micellar dispersion systems to recover tertiary oil from pack. The packs have a water permeability of about 17 darcies and porosities of about 0.5. All floods are performed under similar conditions using an adjusted injection rate equivalent to a frontal advance of about 15 ft./day. The packs are initially saturated with field water having 70,000 parts per million total dissolved solids and with slaughter crude oil. They are then water flooded with simulated water containing 70,000 parts per million total dissolved solids to a residual oil saturation. For comparison, a first run is made using a 0.5 pore volume micellar dispersion of LPG, sodium dodecyl benzene sulfonate, and a sulfonated 4.0 mole ethylene oxide adduct of nonylphenol. The micellar dispersion is followed by an aqueous slug having 1,000 parts per million polysaccharide polymer for mobility control. The same flooding procedure is followed in subsequent runs except that the micellar dispersion also contained 1.0 percent

I claim:
1. In a method for recovering oil from a subterranean formation containing oil and having an injection well and a production well wherein a micellar dispersion is injected into the injection well in order to drive the oil to the production well wherein it is produced the improvement which comprises:
   injecting into the injection well in admixture with the micellar dispersion sulfite lignosulfonates.

2. A method as in claim 1 wherein the sulfite lignosulfonates have a degree of sulfonation ranging from about 2.0 to saturation.

3. A method as in claim 1 wherein the cation associated with the lignosulfonate salts is selected from the group consisting of calcium, magnesium, sodium, potassium, ammonium and ferrochrome.

4. A method as in claim 1 wherein the amount of lignosulfonate salts is present in an amount sufficient to occupy substantially all of the active sites on the formation matrix.

5. In a method for recovering oil from a subterranean formation containing oil and having an injection well and a production well wherein a micellar dispersion is injected into the injection well in order to drive the oil to the production well wherein it is produced the improvement which comprises:
   injecting into the injection well in admixture with the micellar dispersion sulfonated alkali lignins.

6. A method as in claim 5 wherein the sulfonated alkali lignins have a degree of sulfonation ranging from about 2.0 to saturation.

7. A method as in claim 5 wherein the cation associated with the sulfonated alkali lignins is selected from the group consisting of calcium, magnesium, sodium, potassium, ammonium and ferrochrome.

8. A method as in claim 5 wherein the amount of sulfonated alkali lignins is present in an amount sufficient to occupy substantially all of the active sites on the formation matrix.

9. In a method for recovering oil from a subterranean formation containing oil and having an injection well and a production well wherein a micellar dispersion is injected into the injection well in order to drive the oil to the production well wherein it is produced the improvement which comprises:
injecting into the injection well in admixture with the micellar dispersion lignosulfonates.

* * * * *